(12) United States Patent
Wobak et al.

(10) Patent No.: US 11,757,491 B2
(45) Date of Patent: Sep. 12, 2023

(54) COMMUNICATION DEVICE AND METHOD OF OPERATING A COMMUNICATION DEVICE

(71) Applicant: NXP B.V., Eindhoven (NL)

(72) Inventors: Markus Wobak, Graz (AT); Johannes Stahl, Graz (AT); Ulrich Andreas Muehlmann, Graz (AT)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 17/647,285

(22) Filed: Jan. 6, 2022

(65) Prior Publication Data

US 2022/0231728 A1 Jul. 21, 2022

(30) Foreign Application Priority Data

Jan. 18, 2021 (EP) .................................... 21152183

(51) Int. Cl.
| | |
|---|---|
| *H04B 5/00* | (2006.01) |
| *H04B 1/408* | (2015.01) |
| *H04B 1/525* | (2015.01) |

(52) U.S. Cl.
CPC .......... *H04B 5/0031* (2013.01); *H04B 1/408* (2013.01); *H04B 1/525* (2013.01); *H04B 5/0043* (2013.01); *H04B 5/0062* (2013.01)

(58) Field of Classification Search
CPC ...... H04B 5/0031; H04B 1/408; H04B 1/525; H04B 5/0043; H04B 5/0062;
(Continued)

(56) References Cited

U.S. PATENT DOCUMENTS

| | | |
|---|---|---|
| 3,769,575 A | 10/1973 | Rist et al. |
| 4,321,539 A | 3/1982 | Trump |

(Continued)

FOREIGN PATENT DOCUMENTS

WO 2012/002879 A1 1/2012

OTHER PUBLICATIONS

"EMV Contactless Specifications for Payment Systems; Book D; EMV Contactless Communication Protocol Specification"; Version 2.6; Mar. 2016.

(Continued)

*Primary Examiner* — Eugene Yun

(57) ABSTRACT

In accordance with a first aspect, a communication device is provided, comprising: a transmitter configured to transmit one or more radio frequency signal pulses to an external communication device; a receiver configured to receive one or more response signals in response to the radio frequency signal pulses transmitted by the transmitter; a signal analyzer configured to detect one or more characteristics of the response signals, to compare the detected characteristics with predefined reference characteristics and to generate an output indicative of a result of comparing the detected characteristics with the predefined reference characteristics; a processing unit configured to determine at least one category to which the external communication device belongs based on the output generated by the signal analyzer. In accordance with a second aspect, a corresponding method of operating a communication device is conceived. In accordance with a third aspect, a corresponding computer program is provided.

26 Claims, 9 Drawing Sheets

(58) Field of Classification Search
CPC .. H04B 5/0056; G06K 7/10138; Y02D 30/70; H04W 52/0225; H04W 4/80; H04W 52/0248
See application file for complete search history.

(56) References Cited

U.S. PATENT DOCUMENTS

| | | | |
|---|---|---|---|
| 7,103,460 B1* | 9/2006 | Breed | G07C 5/008 706/15 |
| 9,124,302 B2 | 9/2015 | Krishnan et al. | |
| 9,171,440 B2 | 10/2015 | Frederick | |
| 10,945,210 B2 | 3/2021 | Wobak et al. | |
| 11,037,435 B2 | 6/2021 | Wobak et al. | |
| 2010/0259390 A1 | 10/2010 | Borcherding | |
| 2013/0225071 A1 | 8/2013 | Royston et al. | |
| 2016/0322853 A1 | 11/2016 | Porat et al. | |

OTHER PUBLICATIONS

ISO/IEC 14443-1 "Cards and Security Devices for Personal Identification—Contactless Proximity Objects—Part 1: Physical Characteristics"; Fourth Edition; Apr. 2018.
ISO/IEC 14443-2 "Cards and Security Devices for Personal Identification—Contactless Proximity Objects—Part 2: Radio Frequency Power and Signal Interface"; Fourth Edition; Jul. 2020.
ISO/IEC 14443-3 "Cards and Security Devices for Personal Identification—Contactless Proximity Objects—Part 3: Initialization and Anticollision"; Fourth Edition; Jul. 2018.
ISO/IEC 14443-4 "Cards and Security Devices for Personal Identification—Contactless Proximity Objects—Part 4: Transmission Protocol"; Fourth Edition; Jul. 2018.
ISO/IEC 15693-1 "Cards and Security Devices for Personal Identification—Contactless Vicinity Objects—Part 1: Physical Characteristics"; Third Edition; Jul. 2018.
ISO/IEC 15693-2 "Cards and Security Devices for Personal Identification—Contactless Vicinity Objects—Part 2: Air Interface and Initialization"; Third Edition; Apr. 2019.
ISO/IEC 15693-3 "Cards and Security Devices for Personal Identification—Contactless Vicinity Objects—Part 3: Anticollision and Transmission Protocol"; Third Edition; Apr. 2019.
NFC Forum; "Analog Technical Specification"; Version 2.2; Jul. 29, 2021.
NFC Forum; "Digital Protocol Technical Specification"; Version 2.3; Aug. 3, 2021.
U.S. Appl. No. 17/449,988; "RF Communication Devices and Operating Methods," filed Oct. 5, 2021: Inventors: Ulrich Andreas Muehlmann et al.
U.S. Appl. No. 17/448,367; "Classification of Objects in The Proximity of an NFC Reader Device," filed Sep. 22, 2021; Inventors: Johannes Stahl et al.

* cited by examiner

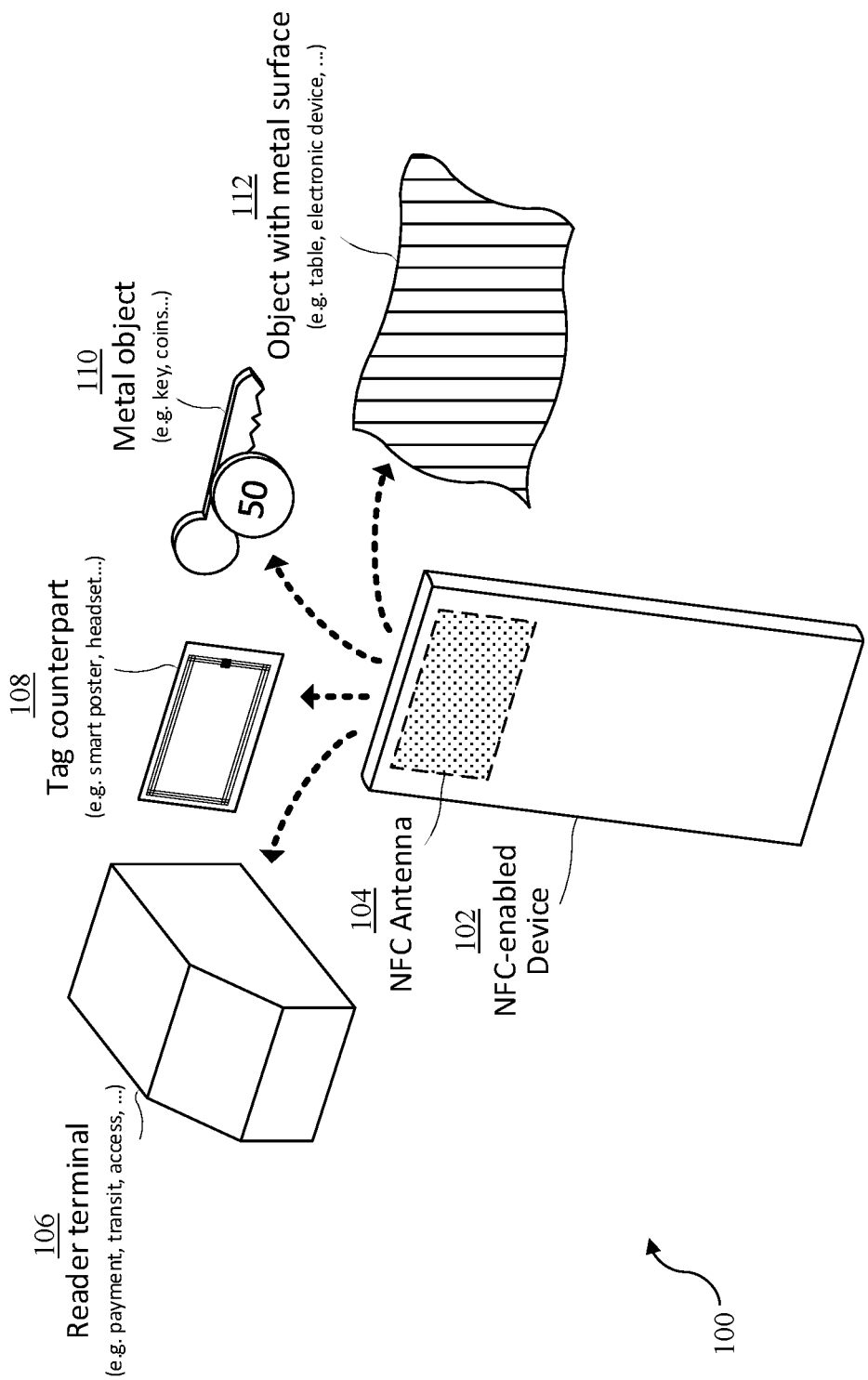

COMMUNICATION DEVICE AND METHOD OF OPERATING A COMMUNICATION DEVICE

CROSS-REFERENCE TO RELATED APPLICATIONS

This application claims priority under 35 U.S.C. § 119 to European Patent Application No. 21152183.6, filed on Jan. 18, 2021, the contents of which are incorporated by reference herein.

TECHNICAL FIELD

The present disclosure relates to a communication device. Furthermore, the present disclosure relates to a corresponding method of operating a communication device, and to a corresponding computer program.

BACKGROUND

Radio frequency (RF) communication devices are widely used. Examples of RF communication devices are near field communication (NFC) devices and radio frequency identification (RFID) devices. Typically, an NFC system or an RFID system includes a reader device—sometimes referred to as a reader, an interrogator or a proximity coupling device (PCD)—which generates a high-frequency radio field, and a passive or active communication counterpart. The communication counterpart may be a passive transponder or an active card emulation device, for example, which may be referred to as a proximity integrated circuit card (PICC). The reader device emits a radio frequency field that may power the communication counterpart. Modulation schemes and signal coding are applied for the communication between the devices. Specific implementation examples are described, inter alia, in the technical standards issued by the NFC Forum, and in the technical standards ISO/IEC 14443, ISO/IEC 15693, ISO/IEC 18092.

A primary device, i.e. a reader, should normally enable its RF field and poll for counterparts in all different communication technologies (such as NFC-A, NFC-B, NFC-F, NFC-V) to detect communication counterparts. Especially for battery-powered devices (e.g. mobile devices, wearables, door lock readers) this is not efficient and reduces device availability due to power limitations. Therefore, a technique called Low Power Card Detection (LPCD) may be applied, which extends the battery lifetime by using short RF sense pulses to detect load changes at the RF interface of the reader. This allows the reader to reduce its RF field ON-duration and to switch to a power-saving state between the sense pulses (e.g. to enter a current-saving standby mode).

SUMMARY

In accordance with a first aspect of the present disclosure, a communication device is provided, comprising: a transmitter configured to transmit one or more radio frequency signal pulses to an external communication device; a receiver configured to receive one or more response signals in response to the radio frequency signal pulses transmitted by the transmitter; a signal analyzer configured to detect one or more characteristics of the response signals, to compare the detected characteristics with predefined reference characteristics and to generate an output indicative of a result of comparing the detected characteristics with the predefined reference characteristics; a processing unit configured to determine at least one category to which the external communication device belongs based on the output generated by the signal analyzer.

In one or more embodiments, the processing unit is further configured to perform at least one of the following operations in dependence on the determined category: send a polling command to the external communication device; start a communication session with the external communication device; configure one or more parameters of the transmitter; configure one or more parameters of the receiver.

In one or more embodiments, the processing unit is further configured to prevent communication with the external communication device in dependence on the determined category.

In one or more embodiments, the signal analyzer comprises a classifier configured to process the response signals.

In one or more embodiments, the characteristics of the response signals comprise steady state complex vector signal characteristics analyzed for a single carrier frequency pulse.

In one or more embodiments, the characteristics of the response signals comprise steady state complex vector signal characteristics analyzed for multiple carrier frequency pulses.

In one or more embodiments, the characteristics of the response signals comprise step response signal characteristics analyzed for a single carrier frequency pulse.

In one or more embodiments, the characteristics of the response signals comprise step response signal characteristics analyzed for multiple carrier frequency pulses.

In one or more embodiments, the characteristics of the response signals comprise characteristics obtained by applying broadband frequency analysis on the response signals when the transmitter transmits a modulated radio frequency signal pulse to the external communication device.

In one or more embodiments, the device is a near field communication device or a radio frequency identification device.

In accordance with a second aspect of the present disclosure, a method of operating a communication device is conceived, the device comprising a transmitter, a receiver, a signal analyzer and a processing unit, the method comprising: transmitting, by the transmitter, one or more radio frequency signal pulses to an external communication device; receiving, by the receiver, one or more response signals in response to the radio frequency signal pulses transmitted by the transmitter; detecting, by the signal analyzer, one or more characteristics of the response signals, comparing the detected characteristics with predefined reference characteristics and generating an output indicative of a result of comparing the detected characteristics with the predefined reference characteristics; determining, by the processing unit, at least one category to which the external communication device belongs based on the output generated by the signal analyzer.

In one or more embodiments, the processing unit performs at least one of the following operations in dependence on the determined category: send a polling command to the external communication device; start a communication session with the external communication device; configure one or more parameters of the transmitter; configure one or more parameters of the receiver.

In one or more embodiments, the processing unit prevents communication with the external communication device in dependence on the determined category.

In one or more embodiments, the signal analyzer comprises a classifier, and the classifier processes the response signals.

In accordance with a third aspect of the present disclosure, a computer program is provided, comprising executable instructions which, when being executed by a communication device, cause said communication device to carry out a method of the kind set forth.

DESCRIPTION OF DRAWINGS

Embodiments will be described in more detail with reference to the appended drawings, in which:

FIG. 1 shows an example of a near field communication (NFC) system;

DESCRIPTION OF EMBODIMENTS

Figure 3:
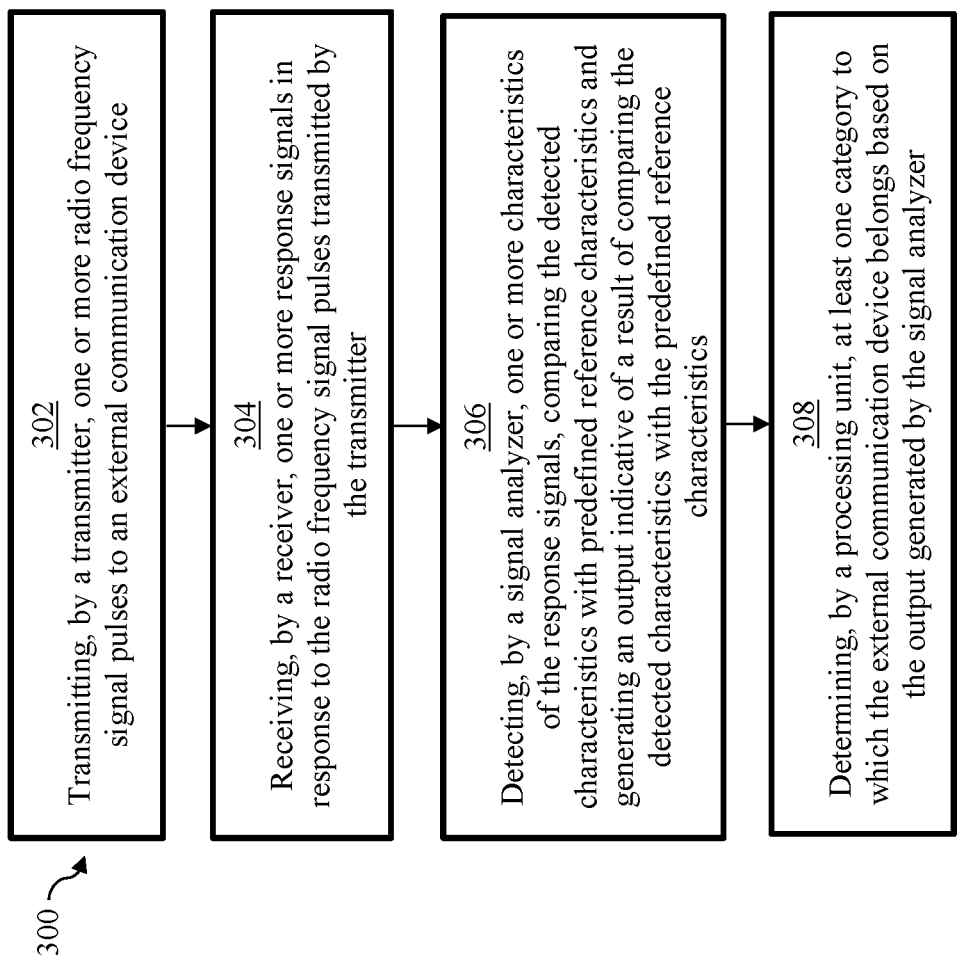
FIG. 3 shows an illustrative embodiment of a method of operating a communication device.

Radio frequency (RF) communication devices are widely used. Examples of RF communication devices are near field communication (NFC) devices and radio frequency identification (RFID) devices. Typically, an NFC system or an RFID system includes a reader device—sometimes referred to as a reader, an interrogator or a proximity coupling device (PCD)—which generates a high-frequency radio field, and a passive or active communication counterpart. The communication counterpart may be a passive transponder or an active card emulation device, for example, which may be referred to as a proximity integrated circuit card (PICC). The reader device emits a radio frequency field that may power the communication counterpart. Modulation schemes and signal coding are applied for the communication between the devices. Specific implementation examples are described, inter alia, in the technical standards issued by the NFC Forum, and in the technical standards ISO/IEC 14443, ISO/IEC 15693, ISO/IEC 18092.

A primary device, i.e. a reader, should normally enable its RF field and poll for counterparts in all different communication technologies (such as NFC-A, NFC-B, NFC-F, NFC-V) to detect communication counterparts. Especially for battery-powered devices (e.g. mobile devices, wearables, door lock readers) this is not efficient and reduces device availability due to power limitations. Therefore, a technique called Low Power Card Detection (LPCD) may be applied, which extends the battery lifetime by using short RF sense pulses to detect load changes at the RF interface of the reader. This allows the reader to reduce its RF field ON-duration and to switch to a power-saving state between the sense pulses (e.g. to enter a current-saving standby mode).

It is noted that Low Power Card Detection (LPCD) may also be referred to, in a more generic sense, as Lower Power Device Detection (LPDD). In other words, the low-power detection techniques as described herein may not only be applied to systems in which physical or virtual smart cards should be detected, for example, but also to systems in which other types of devices should be detected, for example radio frequency identification (RFID) tags or near field communication (NFC) tags.

FIG. 1 shows an example of a near field communication (NFC) system 100. The system 100 comprises an NFC-enabled device 102, which is configured to establish near field communication with other NFC-enabled devices. An example of such other NFC-enabled device is reader terminal 106, which may be used for payment applications, public transit applications, access applications and other applications. Another example of such other NFC-enabled device is NFC tag counterpart 108. An NFC tag is typically a passive device, which may be integrated into a smart poster, a headset or another object or product. The NFC-enabled device 102 contains an NFC antenna 104, which may be coupled inductively to the antennas (not shown) of the other NFC-enabled devices. However, in addition to these NFC-enabled devices, also other objects may be in close proximity of the NFC-enabled device 102, thus entering the RF field emitted by the NFC-enabled device 102. Examples of such objects are metal objects 110, such as keys and coins, and objects 112 having a metal surface, such as tables and electronic devices. These other objects may negatively affect the performance of the NFC-enabled device 102.

In particular, long battery life is an important performance differentiator of mobile devices. NFC functionality has been established on mobile devices for many years already and in order to support ad-hoc functionality, the NFC communication device should be in a stand-by mode and be ready to wake up when an interaction is intended. However, a high false wake-up probability reduces the battery life significantly, and unfortunately an NFC device may not be able to distinguish objects of interest (i.e., objects with which interaction is intended) from other objects, for instance metal objects entering the operational volume.

As mentioned above, short RF sense pulses are commonly used in NFC devices to detect approaching tags. This method may be referred to as LPCD or LPDD. However, a drawback of LPCD is that not only tags may trigger a LPCD wakeup, but also any other device or object causing an RF load change (e.g. a parameter change of the resonant RF circuit). For example, metal objects such as keys, coins, tables or electronic devices in general may cause such an RF load change as well. As a consequence, a NFC-enabled device using LPCD will be woken up regularly due to different types of objects in its proximity and will emit active reader mode polling commands for tags (e.g. according to NFC Forum, EMVCo, ISO/IEC 14443, ISO/IEC 15693 standards). This may result in an unwanted, increased power consumption, which in turn reduces the battery lifetime of mobile devices.

Now discussed are a communication device and a corresponding method of operating a communication device, which facilitate reducing the probability of false wake-ups of the kind set forth, thereby avoiding an increased power consumption and a reduced battery lifetime of said communication device.

Figure 2:
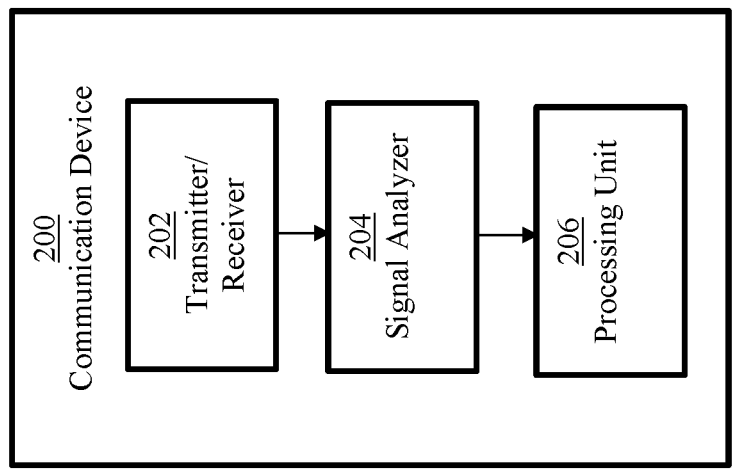
FIG. 2 shows an illustrative embodiment of a communication device.

FIG. 2 shows an illustrative embodiment of a communication device 200. The communication device 200 comprises a transceiver 202, which includes a transmitter part and a receiver part, a signal analyzer 204 and a processing unit 206. The transmitter is configured to transmit one or more radio frequency signal pulses to an external communication device (not shown). The receiver is configured to receive one or more response signals in response to the radio frequency signal pulses transmitted by the transmitter. The signal analyzer 204 is configured to detect one or more characteristics of the response signals, to compare the detected characteristics with predefined reference characteristics and to generate an output indicative of a result of comparing the detected characteristics with the predefined reference characteristics. Furthermore, the processing unit 206 is configured to determine at least one category to which the external communication device belongs based on the output generated by the signal analyzer 204. In this way, by determining said category of external communication device based on the analysis of the response signal characteristics, objects of interest—belonging to a particular category—may easily be distinguishing from other objects—belonging to another category. This, in turn, facilitates reducing the probability of false wake-ups, thereby avoiding an increased power consumption and a reduced battery lifetime of the communication device 200. It is noted that the term "external communication device" should be interpreted broadly, in the sense that it also refers to objects which do not actively communicate signals (for example, metal objects or objects having a metal surface).

In one or more embodiments, the processing unit is further configured to perform at least one of the following operations in dependence on the determined category: send a polling command to the external communication device, start a communication session with the external communication device, configure one or more parameters of the transmitter, and configure one or more parameters of the receiver. In this way, the power consumption of the communication device may easily be controlled in dependence on the category to which the external communication device belongs. This, in turn, may facilitate fine tuning the power consumption and thereby result in an increased performance. In one or more embodiments, the processing unit is further configured to prevent communication with the external communication device in dependence on the determined category. In this way, power-consuming operations may be avoided if, for example, the external communication device belongs to a category of devices with which no interaction is intended (e.g., metal objects such as keys in the proximity of the communication device).

In a practical implementation, the signal analyzer comprises a classifier configured to process the response signals. By using a classifier, the analysis of the response signal can be carried out reliably and efficiently. Furthermore, in one or more embodiments, the characteristics of the response signals comprise steady state complex vector signal characteristics analyzed for a single carrier frequency pulse. These characteristics may facilitate achieving an adequate categorization of the external communication device. In one or more embodiments, the characteristics of the response signals comprise steady state complex vector signal characteristics analyzed for multiple carrier frequency pulses. In this way, achieving an adequate categorization of the external communication device is further facilitated. It is noted that the use of steady state complex vector signal characteristics analyzed for multiple carrier frequency pulses may result in a better categorization of external objects than the use of steady state complex vector signal characteristics analyzed for a single carrier frequency pulse, because more input data will be available. The additional input may however only be obtained at the cost of more processing effort. Accordingly, the use of steady state complex vector signal characteristics analyzed for a single carrier frequency pulse may be more attractive when the processing effort should be minimized. The selection of which and how many frequency components are used for an optimal categorization result may depend on the application. Generally speaking, if more input data are available, the performance of the categorization process will increase, at the cost of more processing effort.

Furthermore, in one or more embodiments, the characteristics of the response signals comprise step response signal characteristics analyzed for a single carrier frequency pulse. This further facilitates achieving an adequate categorization of the external communication device. Generally speaking, a step response is the time behavior of the outputs of a system when its inputs change from zero to one in a short time. In one or more embodiments, the characteristics of the response signals comprise step response signal characteristics analyzed for analyzed for multiple carrier frequency pulses. Again, this further facilitates achieving an adequate categorization of the external communication device. Furthermore, in one or more embodiments, the characteristics of the response signals comprise characteristics obtained by applying broadband frequency analysis on the response signals when the transmitter transmits a modulated radio frequency signal pulse to the external communication device. In this way, achieving an adequate categorization of the external communication device is further facilitated.

FIG. 3 shows an illustrative embodiment of a method 300 of operating a communication device. The method 300 comprises the following steps. At 302, a transmitter comprised in a communication device transmits one or more radio frequency signal pulses to an external communication device. At 304, a receiver comprised in the communication device receives one or more response signals in response to the radio frequency signal pulses transmitted by the transmitter. Furthermore, at 306, a signal analyzer comprised in the communication device detects one or more characteristics of the response signals, compares the detected characteristics with predefined reference characteristics and generates an output indicative of a result of comparing the detected characteristics with the predefined reference characteristics. Furthermore, at 308, a processing unit comprised in the communication device determines at least one category to which the external communication device belongs based on the output generated by the signal analyzer. In this way, reducing the probability of false wake-ups is facilitated, thereby avoiding an increased power consumption and a reduced battery lifetime of the communication device.

Thus, in accordance with the present disclosure, a method of operating a communication device is conceived. The method may be capable of categorizing different objects of interest in the operational volume of the communication device. In other words, different objects of interest may be identified on the basis of the determined category. Therefore, the method may be also be referred to as a robust RF device identification (RRFDID) method. The determined category may be used, for instance, to configure, control, and optimize the NFC communication device, in accordance with the type of device represented by the category. It is noted that the method may be carried out in different stages, for example a pulse emission stage, a response signal reception stage, a processing stage, a classification stage and a decision stage. It is noted that the RRFDID method may be able to discover a variety of objects of interest located in the operational volume. Furthermore, the aforementioned stages may be carried out in real-time with very short emission cycles and with the support of predefined training data or reference measurements.

Figure 4:
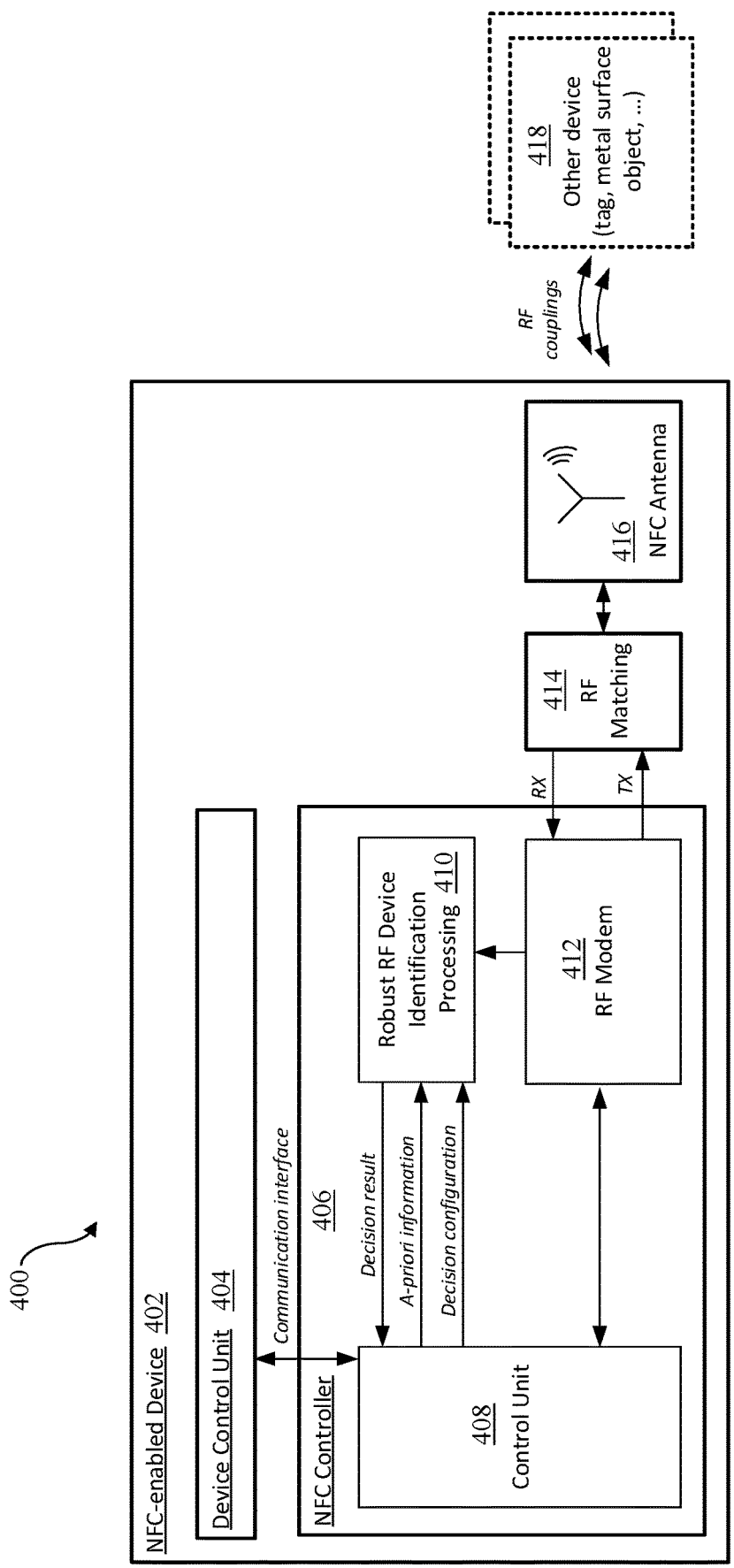
FIG. 4 shows an illustrative embodiment of an NFC system.

FIG. 4 shows an illustrative embodiment of an NFC system 400. The system 400 includes an NFC-enabled device 402 which is configured to detect the presence of another device 418 external to the NFC-enabled device 402. Depending on the category to which the other device 418 belongs, a communicative coupling may be established between the NFC-enabled device 402 and the other device 418. The NFC-enabled device 402 includes a device control unit 404, an NFC controller 406, an RF matching circuit 414 and an NFC antenna 416. Furthermore, the NFC controller 406 includes a control unit 408, a robust RF device identification processing unit 410 and an RF modem 412 (i.e., transmitter and receiver). In accordance with the present disclosure, the processing unit 410 may analyze characteristics of response signals received in response to RF sense pulses transmitted to the other device 418, and categorize the other device 418 using the result of the analysis. Thus, in this example, the processing unit 410 includes a signal analyzer of the kind set forth. It is noted that in other embodiments the signal analyzer and processing unit may be implemented as physically separated components of the communication device.

It is noted that the device control unit 404 may be implemented as an application processor, for example. Furthermore, it is noted that the NFC antenna 416 and the RF matching circuit 414 form a resonant RLC circuit, which enables coupling the NFC antenna 416 to the other device 418. As mentioned, it is important to categorize or identify the other device 418, such that it can be determined whether, for example, interaction with the other device 418 is intended or not. The robust RF device identification processing unit 410 may receive response signal characteristics from the RF modem 412 and analyze those characteristics in order to categorize the other device 418. It is noted that the response signal characteristics are also referred to as the RF features of the response signals herein. Additionally, the control unit 408 may provide a priori information to the robust RF device identification processing unit 410, such as information on environmental conditions (e.g., e.g. RF matching operating conditions, already detected coupled devices), and a decision configuration data set, which supports decision making. In this example, the decision result is received by the control unit 408, which may trigger a configurable action for a detected coupling scenario (i.e., for a determined category). The configurable action may include: notifying the device control unit 404 about a detected coupling scenario, reconfiguring RF modem 412 parameters (e.g., receiver configuration, transmitter shaping and/or power configuration) depending on the detected coupling scenario, and/or starting reader mode RF communication for a detected coupling scenario (e.g., NFC tag reading, EMVCo payment transaction, P2P communication).

Figure 5:
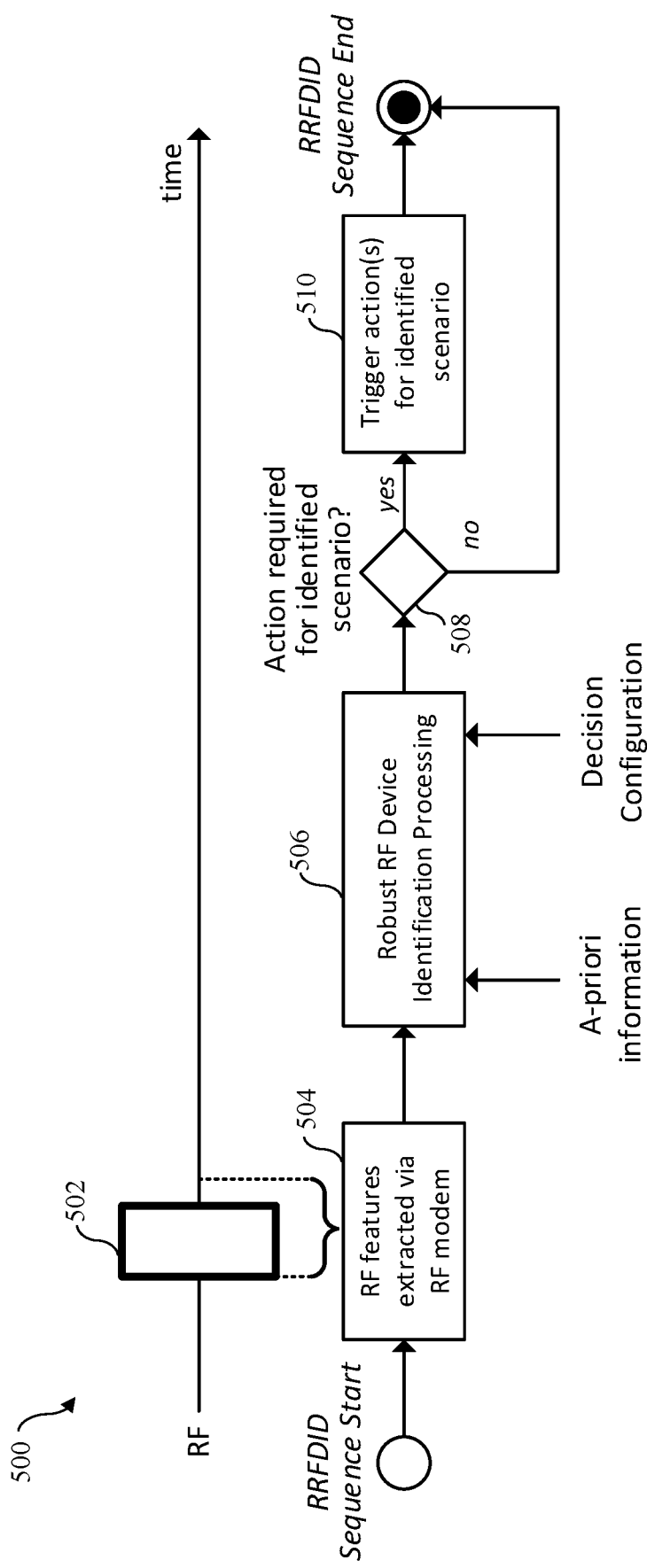
FIG. 5 shows a timing diagram of a robust radio frequency (RF) device identification processing.

FIG. 5 shows a timing diagram 500 of a robust radio frequency (RF) device identification processing of the kind set forth. The block diagram in FIG. 4 shows a simplified representation of an implementation of the communication device. A corresponding exemplary time activity diagram is presented in FIG. 5. The control unit uses the RF modem to transmit a radio frequency (RF) signal pulse 502. In this example, a single carrier frequency transmission is used for the sake of simplicity. In general, more complex transmission pulses may be used to allow extraction of additional features. This may include adding a modulation sequence to the single carrier frequency RF pulse, and/or the use of multiple RF pulses with different single carrier frequencies. Furthermore, RF modem extracts 504 RF features observed during and shortly after an ongoing RF transmission. These features may include steady state complex vector signal characteristic changes at the receiver input (e.g. amplitude and phase) analyzed for single carrier frequency pulse, steady state complex vector signal characteristic changes at the receiver input (e.g. amplitude and phase) analyzed for multiple carrier frequency pulses, step response signal characteristic changes at the receiver input (e.g. a time domain signal change after the RF field has been enabled and disabled) analyzed for single carrier frequency pulse, step response signals characteristic changes at receiver input (e.g. time domain signal change after RF field enabled and disabled) analyzed for multiple carrier frequency pulses, and features derived from a broadband frequency analysis a during modulation sequence pulse. The robust RF device identification processing 506 uses a priori information and decision configuration date to identify the current coupling configuration. Then, it is determined 508 whether an action is required for the identified coupling scenario, and one or more preconfigured actions may be triggered 510. These preconfigured actions may include starting RF communication only with a supported counterpart of interest (COI), and/or using a COI-specific RF communication profile (e.g. polling profile), and/or applying an optimized RF modem configuration for an identified COI (e.g., receiver settings, PCD shaping configuration, power level), and/or notifying a host device about the COI.

The RRFDID method may contain three main stages: (1) an emission stage, (2) a reception stage and (3) an analysis stage. In a practical implementation, these stages can be processed in parallel, as illustrated by the timing diagram shown in FIG. 5. During the first stage, either a short single constant frequency continuous wave emission pulse, a short single constant frequency continuous wave with a modulation sequence emission pulse, or multiple time-multiplexed single frequency continuous wave emission pulses may be emitted. The emitted RF signal passes the Tx-Rx channel (i.e. the channel between transmission and reception path of the device under test (DUT), i.e. of a communication device of the kind set forth) and the DUT receives the channel's response to the emitted signal. During the second stage, the response to the emitted signal is received. Before undergoing the processing in the digital domain, the received signal may pass an I/Q demodulator with zero intermediate frequency mixing. The signal processing is applied to output data of an analog-to-digital converter, which is denoted as x[n] as shown in equation 1.

$$x[n]=x_I[n]+j\,x_Q[n] \quad \text{(Eq. 1)}$$

In equation 1, n is the discrete-time index, $x_I[n]$ corresponds to the I-channel signal, $x_Q[n]$ to the Q-channel signal, and j is the imaginary unit. Depending on the outcome of the third stage and the DUT configuration, the first stage and second stage may be repeated continuously to track the state of the system. During initialization of the system, a calibration may be performed to define an operating point of the analog chain (e.g. gains) that can serve as a reference for the following RRFDID cycles. The intention of the analysis performed in the third stage is to identify certain scenarios of interest, so that the DUT can take actions associated to these scenarios. A scenario of interest could for example be a specific second communication device that is placed in the proximity of the DUT. Identifying the counterpart (or certain parameters associated to the counterpart) without the need to first start a communication with the counterpart, enables a variety of possibilities to optimize the DUT behavior. This includes for example the possibility to avoid communication with devices that are not of interest (according to the configuration of the DUT) or to optimize modem configurations for the communication with certain counterparts even before any communication has been initiated.

Figure 6:
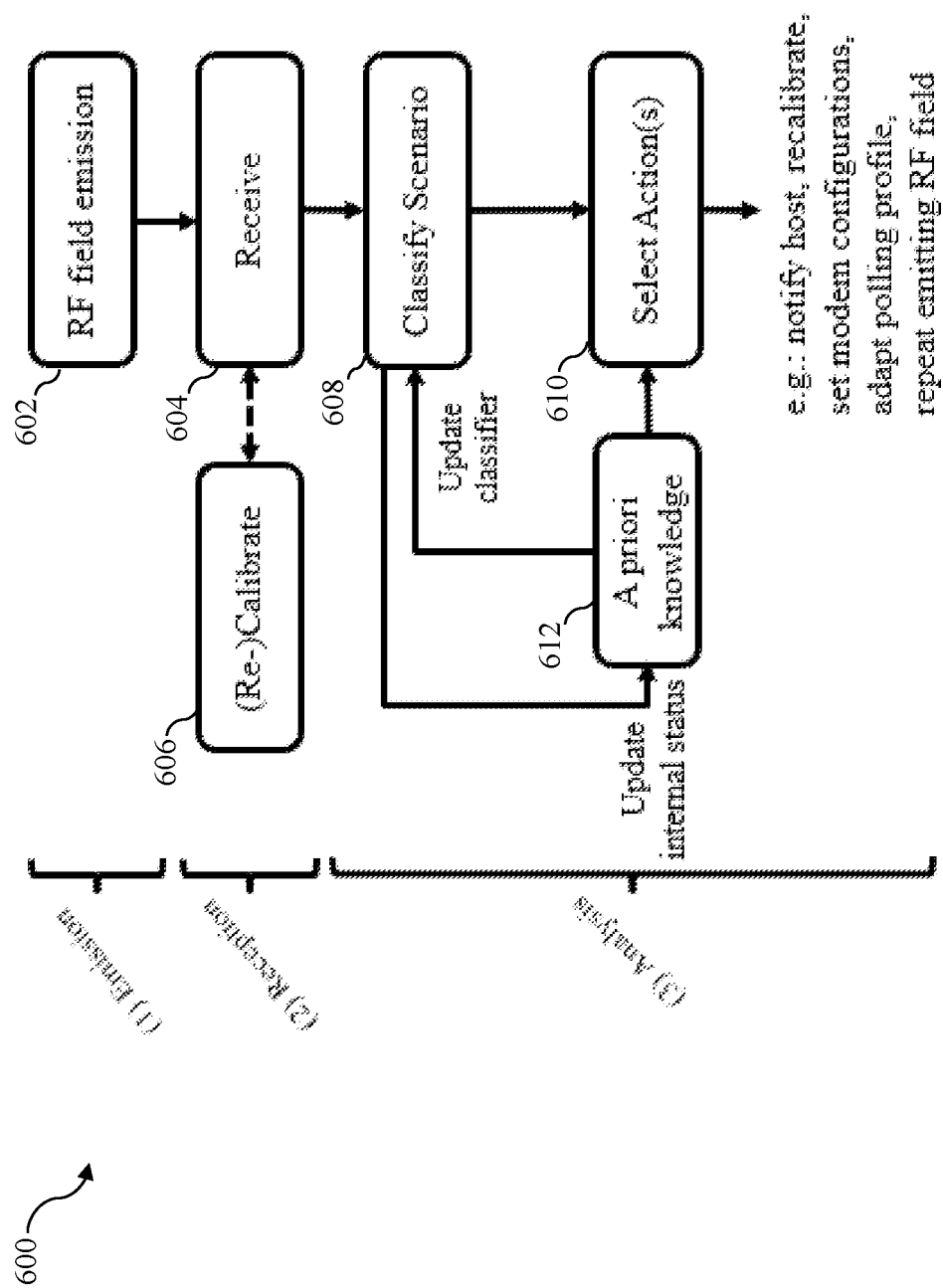
FIG. 6 shows an illustrative embodiment of a robust RF device identification processing cycle.

FIG. 6 shows an illustrative embodiment of a robust RF device identification processing cycle 600. FIG. 6 shows an illustrative embodiment of a robust RF device identification processing cycle 600. The cycle 600 contains the steps of RF field emission 604, receiving 604 of the response signals, calibrate or recalibrate 606, classifying a scenario 608 (i.e., detecting or identifying a coupling scenario), and selecting one or more actions 610 using a priori knowledge 612. In particular, FIG. 6 shows an example of an RRFDID cycle, in which the analysis stage is divided into three blocks that together enable categorizing or identifying the external communication device, or, in other words, identifying a coupling scenario. The scenario is classified 608 based on a set of features extracted from the received signal, which is processed by a classifier. Each feature is evaluated during or after each RF field emission 602 and optionally compared to earlier realizations to judge whether a specific event has occurred. Classifier settings such as, for example, class boundaries, selected input feature transformations, possible output classes, are selected based on the a priori knowledge 612. This a priori knowledge 612 can for example be based on the history of scenarios that has been observed. As an example, the following sequence of events may occur:
1) a mobile phone is placed in the proximity of the DUT;
2) the DUT detects the scenario "mobile phone approached" and performs the corresponding actions (e.g. "recalibrate" 606);
3) the DUT sets its internal status to "object of type mobile phone in proximity";
4) the DUT updates the classifier's threshold settings based on a priori knowledge 612 about the status "object of type mobile phone in proximity";

It is noted that the classifier and its settings may be pre-trained and/or adapt itself online. Depending on the application, it may be useful to exploit the joint characteristics of the features rather than processing them separately.

Figure 7:
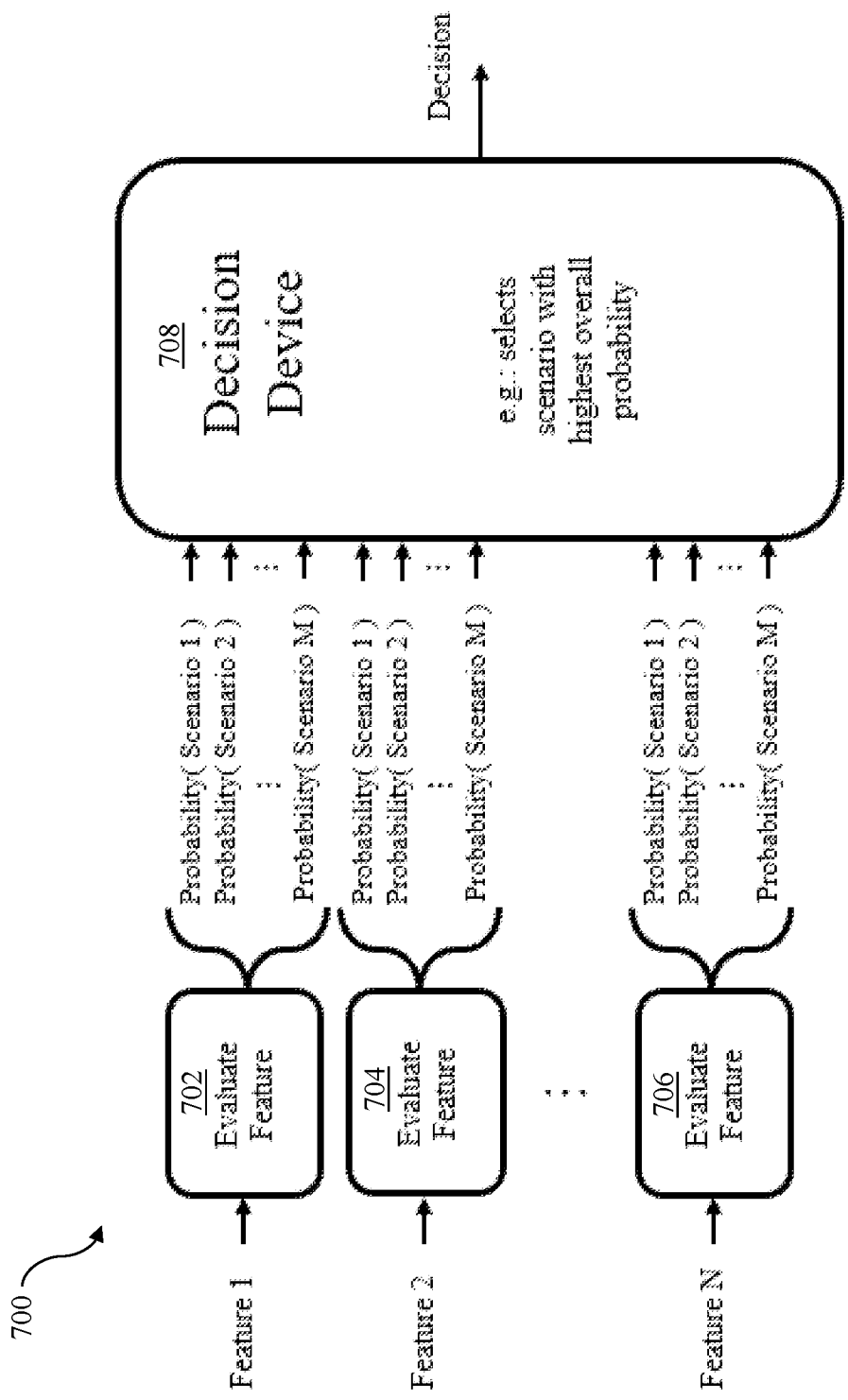
FIG. 7 shows an illustrative embodiment of the processing of RF features.

FIG. 7 shows an illustrative embodiment of the processing 700 of RF features. In particular, several features may be evaluated 702, 704, 706, and a decision device 708 may select a scenario with the highest overall probability based on the evaluated features. In particular, an example is shown of how a joint decision based on all input features may be implemented within the "Classify Scenario" block 608 shown in FIG. 6. In this example, each input feature undergoes an evaluation (e.g., comparison to a threshold) which outputs a probability for each possible scenario. Binary decisions are possible by setting the probability for a specific scenario to 1 while setting all other probabilities to zero. It is not necessary to use every feature to compute probabilities for all output scenarios. One feature might be used to judge if there is an object of interest in the DUT's proximity, while another feature may be used to distinguish different COIs. After the features have been processed separately, a decision device 708 preforms a classification based on the probabilities of each scenario. The decision device 708 may for example calculate a sum over all probability estimates, but it can also perform more complex decisions by taking into account that certain features depend on each other.

Now some examples will be discussed of response signal characteristics that can be used to advantage by a signal analyzer and a processing unit of the kind set forth, to categorize the external communication device. In particular, it will be explained that the categorization or identification of communication counterparts is feasible by using the above-described excitation signals (i.e., RF signal pulses), more specifically by using features extracted from the responses to the excitation signals. For illustration purposes, the separability of counterparts for each feature individually is illustrated. In a first step, all processing approaches presented below extract features, i.e. specific signal characteristics of x[n]. In a second step, the extracted features are subsequently used to perform a classification task. The set of extracted features explained below is merely a selection of features that may be extracted from the received signal; the skilled person will appreciate that other features can also be used to advantage.

A first example of RF features which may be evaluated in accordance with the present disclosure are steady state complex vector signal characteristic changes at the receiver input (e.g. amplitude and phase) analyzed for single carrier frequency pulse. To analyze steady state signal changes of the receiver input, N ADC output samples are averaged to obtain a feature that characterizes the steady state complex vector signal as a response to a single-carrier frequency pulse, as shown in equation 2.

$$\bar{x}(p)=\Sigma_{n=n_0}^{n_0-N-1}x[n] \quad \text{(Eq. 2)}$$

In equation 2, n_0 represents the point in time, at which it is assumed that the system is in steady state and p is an index representing the RRFDID cycle or measurement. For the examples described herein the following value is chosen: N=128. As the above quantity is complex-valued, real and imaginary parts are mapped to separate dimensions, which enables separating different scenarios by evaluating the location of a datapoint in two-dimensional space. Further, to be independent of the receiver chain operating point, the change is analyzed with respect to an initial reference measurement $p_{ref}$ of $\bar{x}$, as shown in equations 3 and 4.

$$\text{Feature 1}=\text{real}(\bar{x}(p)-\bar{x}(p_{ref})) \quad \text{(Eq. 3)}$$

$$\text{Feature 2}=\text{imag}(\bar{x}(p)-\bar{x}(p_{ref})) \quad \text{(Eq. 4)}$$

Figure 8:
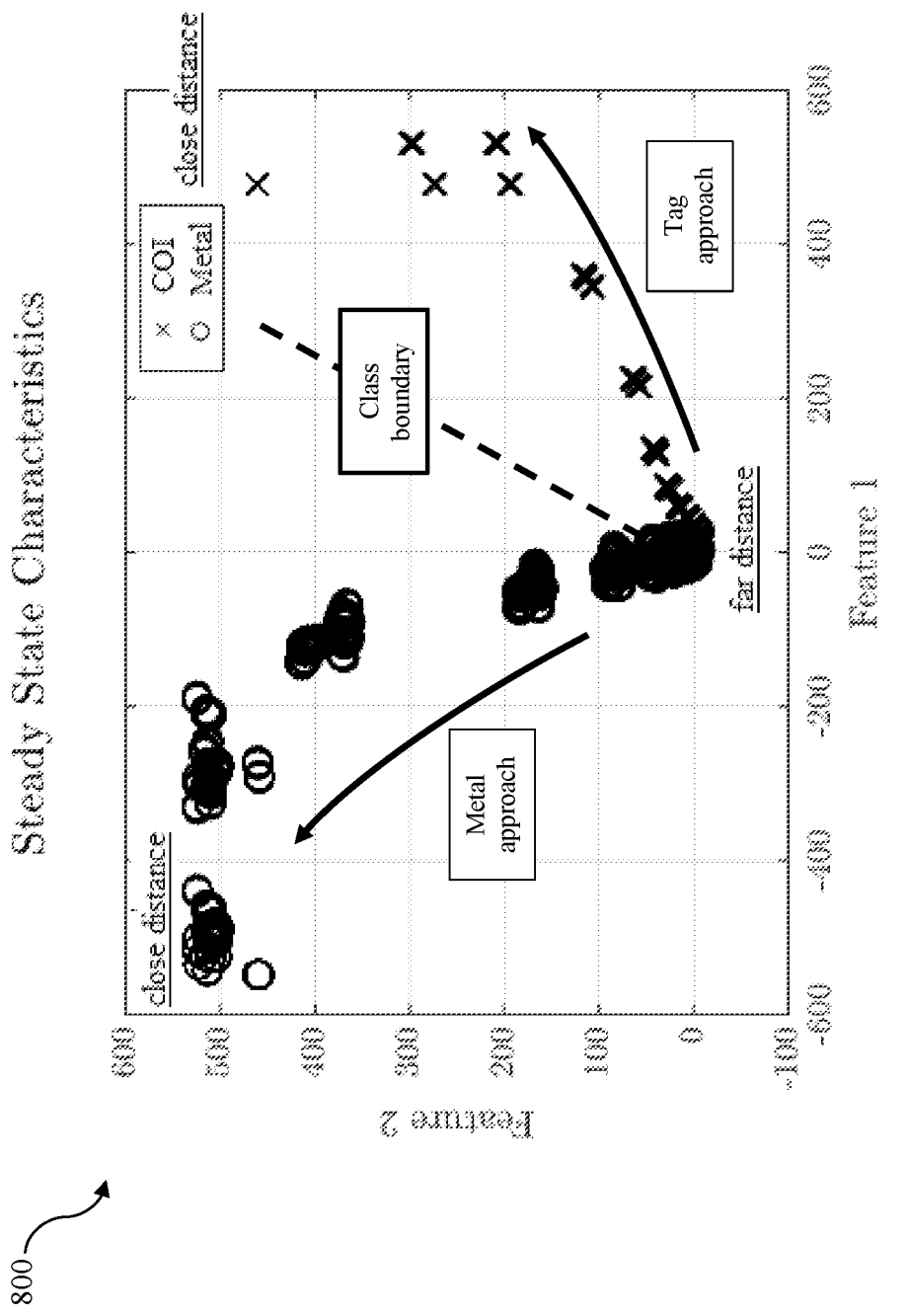
FIG. 8 shows an example of steady state characteristics.

FIG. 8 shows an example of steady state characteristics 800. In particular, it is illustrated that this feature can be used to distinguish NFC tags from metal objects by using a linear boundary between the two classes. The distinct point clouds are a result of the measurement setup, according to which measurements are performed in 5 mm steps. The reliability of the separation is reduced when the distance to the DUT increases. In this example, the a priori knowledge may be a linear boundary (e.g., the dashed line in FIG. 8) that separates the COI and the metal objects from each other. When applied to the process 700 shown in FIG. 7, the distance of a data point to the boundary would determine the probabilities of the scenarios "no object in proximity", "metal object in proximity", "NFC tag in proximity".

Another example of RF features which may be evaluated in accordance with the present disclosure are step response signal characteristic changes at the receiver input (e.g. amplitude and phase change after RF field enabled and disabled). For example, NFC tag identification may be based on analyzing the decay characteristics of the received signal with regard to the oscillatory parameters frequency and decay time. Furthermore, the decay characteristics may be used in combination with further signal features to identify certain communication scenarios and illustrate how to perform this task. For example, external objects may be distinguished using the ringing frequency after the RF field is switched off (referred to as "Feature 3" herein). It is noted that any other characteristics extracted from the signal may be used instead of or in combination with the ringing frequency.

Figure 9B:
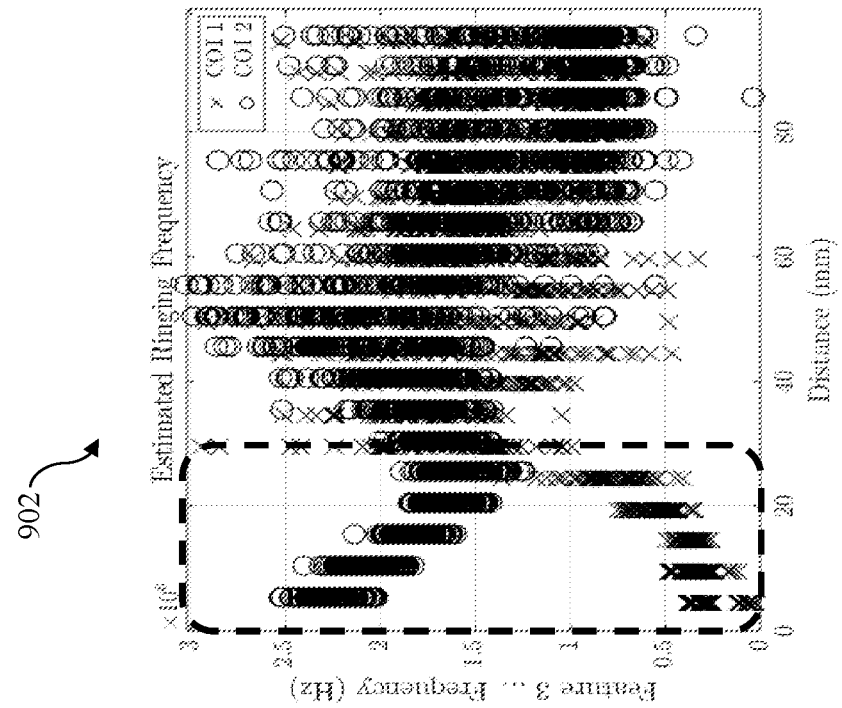
FIG. 9B shows an example of an estimated ringing frequency.
Figure 9A:
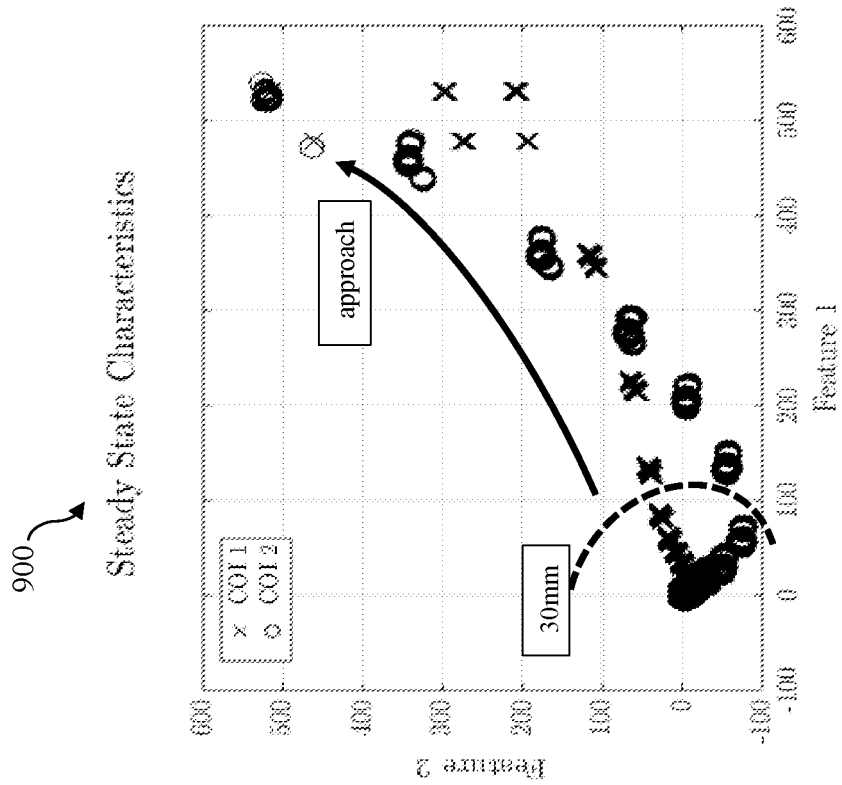
FIG. 9A shows another example of steady state characteristics.

FIGS. 9A and 9B show another example of steady state characteristics and an example of an estimated ringing frequency, respectively. FIG. 9A shows the steady state complex vector signal characteristic changes at the receiver input and FIG. 9B shows the estimated frequency of the ringing after the RF field has been switched off for two different COIs, in this case NFC tags. It can be seen that the distinction between two COIs (in this case two NFC tags) based on Feature 1 and Feature 2 may not be possible (FIG. 9A). However, the estimated ringing frequency reveals significant differences between the two COIs for distances smaller than 30 mm (FIG. 9B). The decision device 708 shown in FIG. 7 may exploit this observation by first evaluating if a COI has approached the DUT (to within a distance smaller than 30 mm) and then, if the approaching object has been identified as a COI, to classify the COI type by evaluating Feature 3 in a second step.

Another example of RF features which may be evaluated in accordance with the present disclosure are characteristics obtained by applying broadband frequency analysis on the response signals when the transmitter transmits a modulated radio frequency signal pulse to the external communication device. The features described the above-given examples are derived from single-frequency signals and may be evaluated consecutively for different frequencies. Alternatively, a short single-frequency carrier pulse may be emitted, which is modulated by a pseudorandom binary sequence (PRBS). The modulation widens the spectrum of the excitation signal, and therefore enables access to additional information about the channel that is being analyzed.

Figure 10:
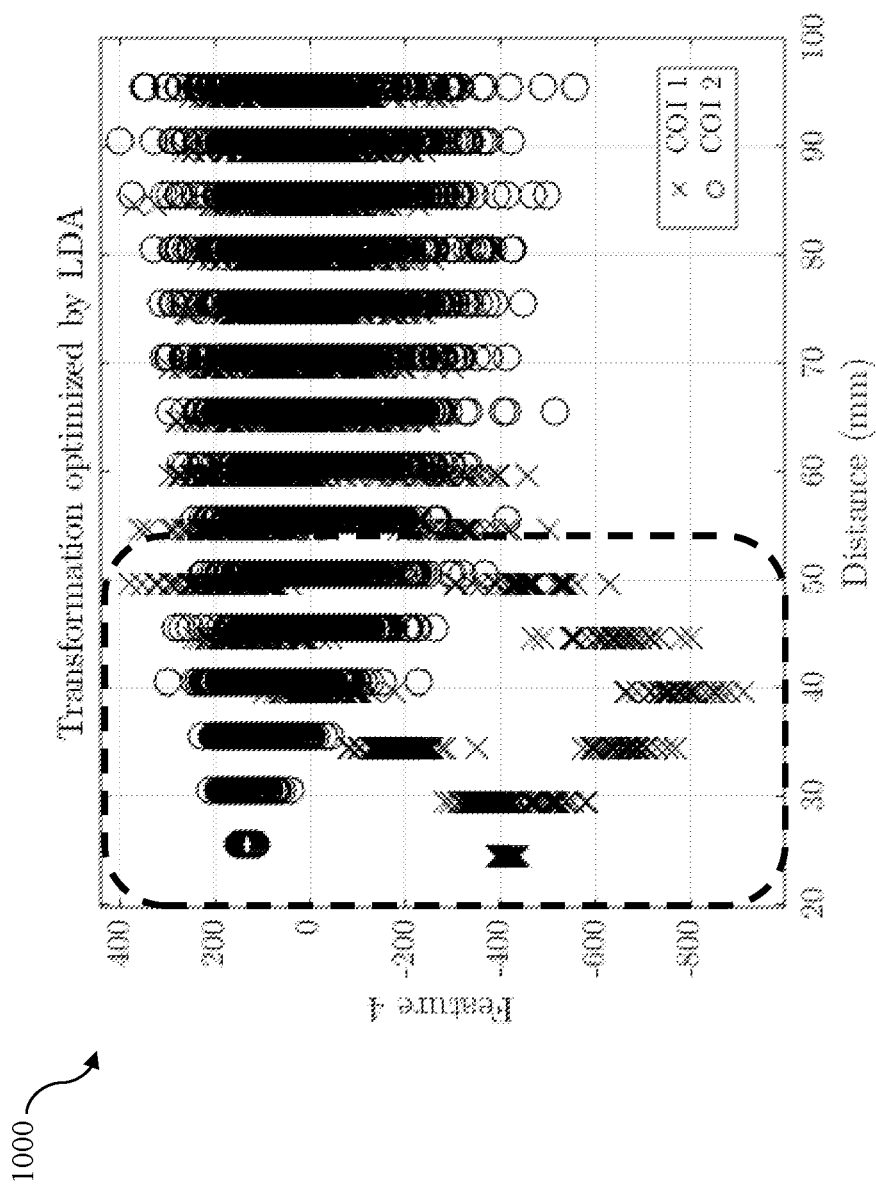
FIG. 10 shows an example of a transformation optimized by linear discriminant analysis (LDA).

FIG. 10 shows an example of a transformation optimized by linear discriminant analysis (LDA) 1000. In this example, the feature extraction includes taking the discrete Fourier transform (DFT) of the complex baseband signal, for example by using fast Fourier transform (FFT) and computing a linear combination of ratios of spectral magnitudes, as shown in equation 5.

$$\text{Feature 4} = \sum_{l=1}^{N_{DFT}} \sum_{m=1}^{N_{DFT}} a_{l,m} \frac{|X[l]|}{|X[m]|} \qquad \text{[Eq. 5]}$$

In equation 5, X is the $N_{DFT}$ point DFT of x[n] and $a_{l,m}$ corresponds to a real-valued weight. This processing makes PRBS features extracted from different measurement scenarios comparable amongst each other. The weights $a_{l,m}$ of the linear transformation may be automatically optimized for separability of communication scenarios, e.g. by using linear discriminant analysis (LDA) or principal component analysis (PCA). For example, to generate the data for FIG. 10, the transformation was optimized to distinguish two COIs at a distance of 25 mm. Again, the decision device 708 may use the additional information captured by Feature 4 to increase the robustness of the RRFDID method.

The systems and methods described herein may at least partially be embodied by a computer program or a plurality of computer programs, which may exist in a variety of forms both active and inactive in a single computer system or across multiple computer systems. For example, they may exist as software program(s) comprised of program instructions in source code, object code, executable code or other formats for performing some of the steps. Any of the above may be embodied on a computer-readable medium, which may include storage devices and signals, in compressed or uncompressed form.

As used herein, the term "computer" refers to any electronic device comprising a processor, such as a general-purpose central processing unit (CPU), a specific-purpose processor or a microcontroller. A computer is capable of receiving data (an input), of performing a sequence of predetermined operations thereupon, and of producing thereby a result in the form of information or signals (an output). Depending on the context, the term "computer" will mean either a processor in particular or more generally a processor in association with an assemblage of interrelated elements contained within a single case or housing.

The term "processor" or "processing unit" refers to a data processing circuit that may be a microprocessor, a co-processor, a microcontroller, a microcomputer, a central processing unit, a field programmable gate array (FPGA), a programmable logic circuit, and/or any circuit that manipulates signals (analog or digital) based on operational instructions that are stored in a memory. The term "memory" refers to a storage circuit or multiple storage circuits such as read-only memory, random access memory, volatile memory, non-volatile memory, static memory, dynamic memory, Flash memory, cache memory, and/or any circuit that stores digital information.

As used herein, a "computer-readable medium" or "storage medium" may be any means that can contain, store, communicate, propagate, or transport a computer program for use by or in connection with the instruction execution system, apparatus, or device. The computer-readable medium may be, for example but not limited to, an electronic, magnetic, optical, electromagnetic, infrared, or semiconductor system, apparatus, device, or propagation medium. More specific examples (non-exhaustive list) of the computer-readable medium may include the following: an electrical connection having one or more wires, a portable computer diskette, a random-access memory (RAM), a read-only memory (ROM), an erasable programmable read-only memory (EPROM or Flash memory), an optical fiber, a portable compact disc read-only memory (CDROM), a digital versatile disc (DVD), a Blu-ray disc (BD), and a memory card.

It is noted that the embodiments above have been described with reference to different subject-matters. In particular, some embodiments may have been described with reference to method-type claims whereas other embodiments may have been described with reference to apparatus-type claims. However, a person skilled in the art will gather from the above that, unless otherwise indicated, in addition to any combination of features belonging to one type of subject-matter also any combination of features relating to different subject-matters, in particular a combination of features of the method-type claims and features of the apparatus-type claims, is considered to be disclosed with this document.

Furthermore, it is noted that the drawings are schematic. In different drawings, similar or identical elements are provided with the same reference signs. Furthermore, it is noted that in an effort to provide a concise description of the illustrative embodiments, implementation details which fall into the customary practice of the skilled person may not have been described. It should be appreciated that in the development of any such implementation, as in any engineering or design project, numerous implementation-specific decisions must be made in order to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill.

Finally, it is noted that the skilled person will be able to design many alternative embodiments without departing from the scope of the appended claims. In the claims, any reference sign placed between parentheses shall not be construed as limiting the claim. The word "comprise(s)" or "comprising" does not exclude the presence of elements or steps other than those listed in a claim. The word "a" or "an" preceding an element does not exclude the presence of a plurality of such elements. Measures recited in the claims may be implemented by means of hardware comprising several distinct elements and/or by means of a suitably programmed processor. In a device claim enumerating several means, several of these means may be embodied by one and the same item of hardware. The mere fact that certain measures are recited in mutually different dependent claims does not indicate that a combination of these measures cannot be used to advantage.

LIST OF REFERENCE SIGNS 100 near field communication (NFC) system
102 NFC-enabled device
104 NFC antenna
106 reader terminal
108 tag counterpart
110 metal object
112 object with metal surface
200 communication device
202 transmitter/receiver
204 signal analyzer
206 processing unit
300 method of operating a communication device
302 transmitting, by a transmitter, one or more radio frequency signal pulses to an external communication device
304 receiving, by a receiver, one or more response signals in response to the radio frequency signal pulses transmitted by the transmitter
306 detecting, by a signal analyzer, one or more characteristics of the response signals, comparing the detected characteristics with predefined reference characteristics and generating an output indicative of a result of comparing the detected characteristics with the predefined reference characteristics
308 determining, by a processing unit, a category to which the external communication device belongs based on the output generated by the signal analyzer
400 NFC system
402 NFC-enabled device
404 device control unit
406 NFC controller
408 control unit
410 robust RF device identification processing
412 RF modem
414 RF matching
416 NFC antenna
418 other device
500 timing diagram of robust RF device identification processing
502 radio frequency signal pulse
504 RF features extracted via RF modem
506 robust RF device identification processing
508 action required for identified scenario?
510 trigger action or actions for identified scenario
600 robust RF device identification processing cycle
602 RF field emission
604 receive
606 calibrate or recalibrate
608 classify scenario
610 select action or actions
612 a priori knowledge
700 processing of RF features
702 evaluate feature
704 evaluate feature
706 evaluate feature
708 decision device
800 steady state characteristics
900 steady state characteristics
902 estimated ringing frequency
1000 transformation optimized by LDA

The invention claimed is:

1. A communication device, comprising:
a transmitter configured to transmit one or more radio frequency signal pulses to an external object;
a receiver configured to receive one or more response signals in response to the radio frequency signal pulses transmitted by the transmitter;
a signal analyzer configured to detect one or more characteristics of the response signals, to compare the detected characteristics with predefined reference characteristics and to generate an output indicative of a result of comparing the detected characteristics with the predefined reference characteristics; and
a processing unit configured to determine at least one category to which the external object belongs based on the output generated by the signal analyzer, wherein the at least one category to which the external object belongs indicates whether the external object is a counterpart device of the communication device capable of directing communication signals to the communication device;
wherein the one or more characteristics of the response signals comprise steady state complex vector signal characteristics of the response signals or step response signal characteristics of the response signals.

2. The device of claim 1, wherein the processing unit is further configured to perform at least one of the following operations in dependence on the determined category:
send a polling command to the external object;
start a communication session with the external object;
configure one or more parameters of the transmitter; and
configure one or more parameters of the receiver.

3. The device of claim 1, wherein the processing unit is further configured to prevent communication with the external communication device in dependence on the determined category, in response to determining that the external object is not capable of directing communication signals to the communication device.

4. The device of claim 1, wherein the signal analyzer comprises a classifier configured to process the response signals.

5. The device of claim 1, wherein the characteristics of the response signals comprise steady state complex vector signal characteristics analyzed for a single carrier frequency pulse.

6. The device of claim 1, wherein the characteristics of the response signals comprise steady state complex vector signal characteristics analyzed for multiple carrier frequency pulses.

7. The device of claim 1, wherein the characteristics of the response signals comprise step response signal characteristics analyzed for a single carrier frequency pulse.

8. The device of claim 1, wherein the characteristics of the response signals comprise step response signal characteristics analyzed for multiple carrier frequency pulses.

9. The device of claim 1, wherein the characteristics of the response signals comprise characteristics obtained by applying broadband frequency analysis on the response signals when the transmitter transmits a modulated radio frequency signal pulse to the external object.

10. The device of claim 1, wherein the device is a near field communication device or a radio frequency identification device.

11. The device of claim 1, wherein the processing unit is further configured to cause the communication device to enter a power-saving state in which it does not transmit communication signals to the external object, in response to determining that the at least one category to which the external object belongs indicates that the external object is not a counterpart device of the communication device capable of directing communication signals to the communication device.

12. The device of claim 1, wherein the processing unit is further configured to cause the communication device to exit a power-saving state in which it does not transmit communication signals to the external object and to begin transmitting communication signals to the external object, in response to determining that the at least one category to which the external object belongs indicates that the external object is a counterpart device of the communication device capable of directing communication signals to the communication device.

13. The device of claim 12, wherein, the communication signals comprise active reader mode polling commands.

14. A method of operating a communication device, the device comprising a transmitter, a receiver, a signal analyzer and a processing unit, the method comprising:
transmitting, by the transmitter, one or more radio frequency signal pulses to an external object;
receiving, by the receiver, one or more response signals in response to the radio frequency signal pulses transmitted by the transmitter;
detecting, by the signal analyzer, one or more characteristics of the response signals, comparing the detected characteristics with predefined reference characteristics and generating an output indicative of a result of comparing the detected characteristics with the predefined reference characteristics; and
determining, by the processing unit, at least one category to which the external object belongs based on the output generated by the signal analyzer, wherein the at least one category to which the external object belongs indicates whether the external object is a counterpart device of the communication device capable of directing communication signals to the communication device;
wherein the one or more characteristics of the response signals comprises steady state complex vector signal characteristics of the response signals or step response signal characteristics of the response signals.

15. The method of claim 14, wherein the processing unit performs at least one of the following operations in dependence on the determined category:
send a polling command to the external object;
start a communication session with the external object;
configure one or more parameters of the transmitter; and
configure one or more parameters of the receiver.

16. The method of claim 15, wherein the method further comprises the processing unit causing the communication device to enter a power-saving state in which it does not transmit communication signals to the external object, in response to determining that the at least one category to which the external object belongs indicates that the external object is not a counterpart device of the communication device capable of directing communication signals to the communication device.

17. The method of claim 15, wherein the method further comprises the processing unit causing the communication device to exit a power-saving state in which it does not transmit communication signals to the external object and to begin transmitting communication signals to the external object in response to determining that the at least one category to which the external object belongs indicates that the external object is a counterpart device of the communication device capable of directing communication signals to the communication device.

18. The method of claim 17, wherein, the communication signals comprise active reader mode polling commands.

19. The method of claim 14, wherein the processing unit prevents communication with the external object in dependence on the determined category.

20. The method of claim 14, wherein the signal analyzer comprises a classifier, and wherein the classifier processes the response signals.

21. The method of claim 14, wherein the characteristics of the response signals comprise steady state complex vector signal characteristics analyzed for a single carrier frequency pulse.

22. The method of claim 14, wherein the characteristics of the response signals comprise steady state complex vector signal characteristics analyzed for multiple carrier frequency pulses.

23. The method of claim 14, wherein the characteristics of the response signals comprise step response signal characteristics analyzed for a single carrier frequency pulse.

24. The method of claim 14, wherein the characteristics of the response signals comprise step response signal characteristics analyzed for multiple carrier frequency pulses.

25. The method of claim 14, wherein the characteristics of the response signals comprise characteristics obtained by applying broadband frequency analysis on the response signals when the transmitter transmits a modulated radio frequency signal pulse to the external object.

26. A computer program product comprising a non-transitory storage medium storing executable instructions which, when executed by a communication device, are configured to cause said communication device to carry out the method of claim 14.

* * * * *